(12) United States Patent
Taylor (10) Patent No.: US 6,904,184 B1
(45) Date of Patent: Jun. 7, 2005

(54) IMAGE PROCESSING APPARATUS

(75) Inventor: Richard Ian Taylor, Guilford (GB)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/519,666

(22) Filed: Mar. 6, 2000

(30) Foreign Application Priority Data

Mar. 17, 1999 (GB) ............................................. 9906204

(51) Int. Cl.[7] .................................................. G06K 9/32
(52) U.S. Cl. ....................... 382/294; 382/154; 396/187; 348/239
(58) Field of Search ................................ 382/100, 103, 382/154, 168, 181, 184, 201, 232, 236, 243, 254, 276, 287, 291, 293, 294, 296, 305, 300, 295, 290; 345/606, 619, 532, 818, 814, 864, 659; 348/36, 139, 143, 317, 239, 154, 38, 39, 50, 169; 396/9, 63, 80, 153, 187, 265; 352/84; 250/458.1; 386/123; 708/100

(56) References Cited

U.S. PATENT DOCUMENTS

| | | | |
|---|---|---|---|
| 3,790,262 A | 2/1974 | Van Derwater et al. | ...... 352/84 |
| 3,971,620 A * | 7/1976 | Everett | ........................ 359/430 |
| 4,052,126 A | 10/1977 | Freudenschuss et al. | ...... 352/84 |
| 4,466,721 A | 8/1984 | Detuzzi | .................... 354/267.1 |
| 4,791,310 A * | 12/1988 | Honing et al. | ............. 250/458.1 |
| 4,916,540 A * | 4/1990 | Kosaka | ........................ 348/580 |
| 5,214,751 A * | 5/1993 | Robert | ........................ 395/129 |
| 5,530,797 A * | 6/1996 | Uya et al. | .................... 395/164 |
| 5,625,410 A * | 4/1997 | Washino et al. | ............. 348/154 |
| 6,011,901 A * | 1/2000 | Kirsten | ........................ 386/123 |
| 6,362,850 B1 * | 3/2002 | Alsing et al. | ................ 348/239 |
| 6,437,794 B1 * | 8/2002 | Ohshima et al. | ............. 345/619 |

FOREIGN PATENT DOCUMENTS

| | | | |
|---|---|---|---|
| EP | 0294282 A | 12/1988 | ............ H04N/7/01 |
| GB | 2110046 A | 6/1983 | ............ H04N/5/02 |
| GB | 2176968 A | 1/1987 | ............ H04N/7/01 |

OTHER PUBLICATIONS

"Adaptive Least Square Correlation: A Powerful Image Matching Technique", A.W. Gruen, Journal of Photogrammetry, Remote Sensing and Cartography, 14(3), 1985, pp. 175–187.

"Alignment By Maximization of Mutual Information", P. Viola et al., ICCV.5, Jun. 20–23, 1995, MIT, ISBN 0–8186–7042–8, pp. 16–23.

* cited by examiner

Primary Examiner—Bhavesh M. Mehta
Assistant Examiner—Seyed Azarian
(74) Attorney, Agent, or Firm—Fitzpatrick, Cella, Harper & Scinto (57) ABSTRACT

In an image processing apparatus, image data, defining input images of a scene recorded at different times and with different viewing positions and viewing directions, is processed to generate data defining a time-lapse sequence of images for display to a user showing an evolving representation of the scene between the times at which the first and last input images were recorded. Processing is carried out to register the input images by calculating the transformations which align matching features in the images, and interpolation is carried out between the pixel values of the registered images to generate pixel values for interpolated images in the time-lapse sequence. In this way, it is not necessary for the photographer to leave a camera in position to record images for a time-lapse sequence. Instead, the photographer can return to the scene as and when required to record the images since the viewing position and viewing direction for the images do not need to be the same.

24 Claims, 5 Drawing Sheets

IMAGE PROCESSING APPARATUS

BACKGROUND OF THE INVENTION

Field of the Invention

The present invention relates to the field of time-lapse photography.

In time-lapse photography, a camera is periodically operated to photograph a subject, and then the recorded images are viewed, usually in the form of a "movie", over a period of time which is much shorter than the period over which the photographs were taken. This enables a slowly occurring change in the subject (which would normally occur at a speed too slow to see) to be studied at a faster than normal rate.

Considerable work has been carried out in the field of time-lapse photography to improve the functionality of time-lapse photographic equipment to give the user more control over the recording process, for example by controlling the exposure duration and exposure interval etc (see for example U.S. Pat. No. 3,790,262, U.S. Pat. No. 4,466,721 and U.S. Pat. No. 4,052,126). However, existing systems still suffer from many problems, in particular inflexibility, difficulty of use and cost.

SUMMARY OF THE INVENTION

The present invention has been made with the above problems in mind.

According to the present invention, there is provided a method or apparatus for generating image data for a time-lapse sequence of a scene in which image data recorded of the scene at different times is processed in such a way that the images need not have been recorded at the same position and with the same viewing direction.

This enables the photographer to revisit this scene at the required times without having to leave the camera in place in between, and, if required, to exercise full manual control of the camera to record the images.

The present invention also provides an image processing apparatus or method for processing input images of a scene recorded at different times and with different viewing characteristics in which processing is carried out to correct for the different viewing characteristics.

The present invention further provides an image processing apparatus or method in which image data defining images recorded of the scene at different times is processed to align the input images and to generate data for a time-lapse sequence at times between the times at which the input images were recorded by calculating data defining synthetic images.

The present invention further provides instructions, both in recorded and signal form, for configuring a programmable processing apparatus to perform such a method or to become configured as such an apparatus.

Embodiments of the invention will now be described, by way of example only, with reference to the accompanying drawings in which:

DETAILED DESCRIPTION OF THE PREFERRED EMBODIMENTS

Figure 1:
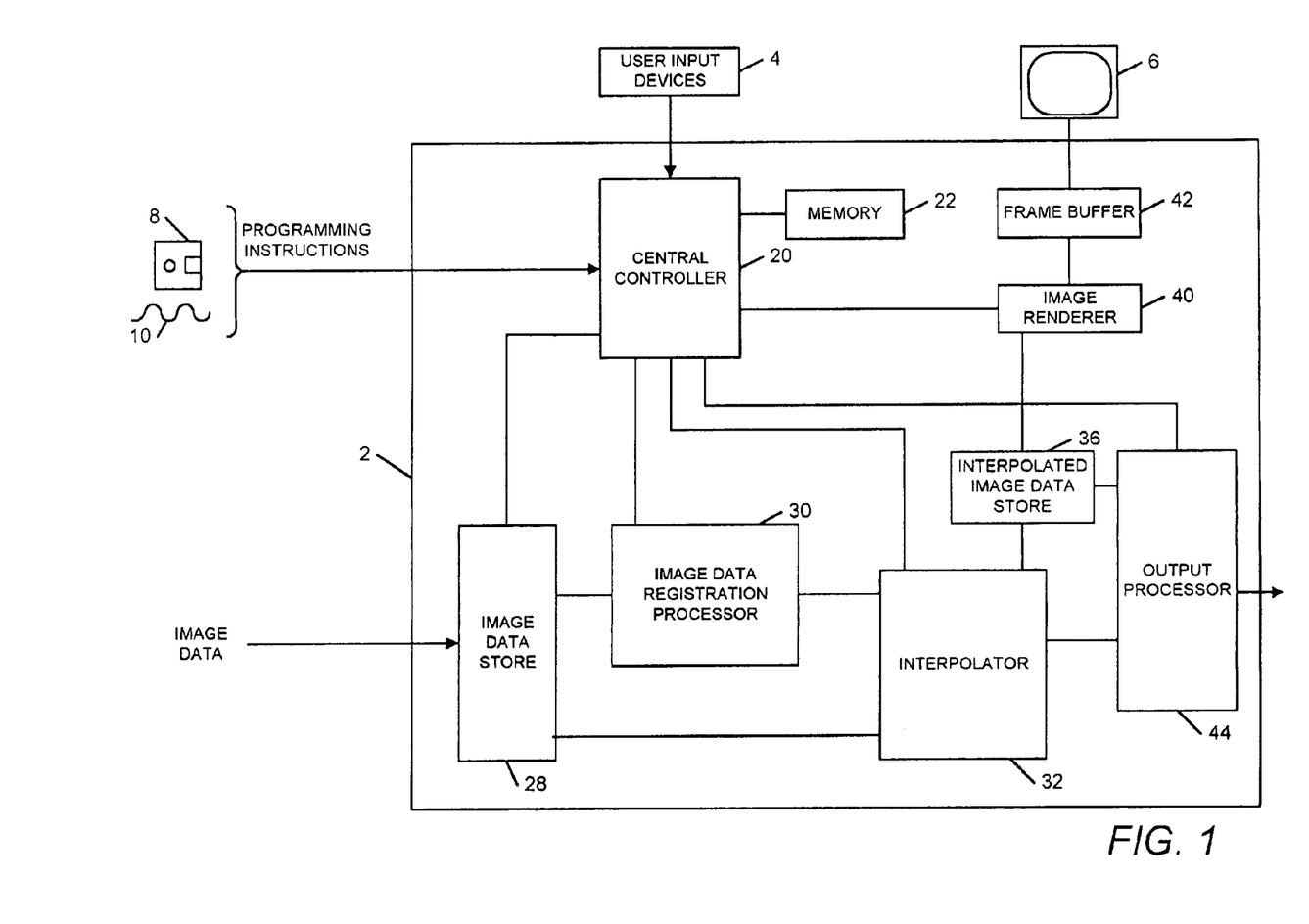
FIG. 1 is a block diagram showing an example of notional functional components within a processing apparatus of an embodiment of the invention.

Referring to FIG. 1, an embodiment of the invention comprises a processing apparatus 2, such as a personal computer, user input devices 4, such as a keyboard, mouse etc., and a display device 6, such as a conventional personal computer monitor.

The processing apparatus 2 is programmed to operate in accordance with programming instructions input for example as data stored on a data storage medium, such as disk 8, and/or as a signal 10 input to the processing apparatus, for example from a remote database, over a datalink (not shown) such as the Internet, and/or entered by a user via a user input device 4.

The programming instructions comprise instructions to cause the processing apparatus 2 to become configured to process images of a scene taken at different times and from different viewing positions and/or viewing directions and to generate from this input image data image data defining a sequence of images for display which represents an evolving representation of the part of the scene which is present in all of the input images between the times at which the input images were recorded (that is, a so-called "time-lapse" sequence).

When programmed by the programming instructions, processing apparatus 2 effectively becomes configured into a number of functional units for performing processing operations. Examples of such functional units and their interconnections are shown in FIG. 1. The illustrated units and interconnections in FIG. 1 are, however, notional and are shown for illustration purposes only to assist understanding; they do not necessarily represent the exact units and connections into which the processor, memory etc. of the processing apparatus become configured.

Referring to the functional units shown in FIG. 1, central controller 20 processes inputs from the user input devices 4, and also provides control and processing for a number of the other functional units. Memory 22 is provided for use by central controller 20 and other functional units.

Image data store 28 stores the image data representing pictures of a scene input to the processing apparatus 2. Image data registration processor 30 and interpolator 32 perform processing of the image data stored in image data store 28 to generate image data defining images to be displayed in a "time-lapse" sequence of images. Image data generated by interpolator 32 is stored in the interpolated image data store 36.

Image renderer 40 reads image data from the image data store 28 and the interpolated image data store 36 and generates pixel data for images to be displayed. The pixel data generated by image renderer 40 is written to frame buffer 42 for display on the display device 6 at a video rate.

Output processor 44 generates data for output to another processing apparatus conveying sufficient information that the time lapse sequence of images produced by processing apparatus 2 can be generated from the data by the receiving apparatus.

FIGS. 2a, 2b, 2c and 2d show examples of input images to be processed by processing apparatus 2 in this embodiment.

Each of the images shown in FIGS. 2a, 2b, 2c and 2d comprises a picture of a scene (in this example, a garden) taken at different times. More particularly, the image shown in FIG. 2a was recorded at the earliest time of the four images, the image shown in FIG. 2b was recorded next, followed by the image shown in FIG. 2c and finally the image shown in FIG. 2d. As can be seen from FIGS. 2a, 2b, 2c and 2d, changes have occurred in the scene between the times at which the images were recorded (in this example, plants, shrubs and weeds have grown in the garden). Processing apparatus 2 is arranged to process the image data defining these input images to generate many more images representing the scene at times between those at which the input images were recorded. The input images and the generated images are then used to display a sequence of images to a user at video rate (or at a user-controlled speed, e.g. fast forward, reverse, pause etc.) showing how the scene changes over time (that is, in this example, how the plants, shrubs and weeds grow).

Figure 2A:
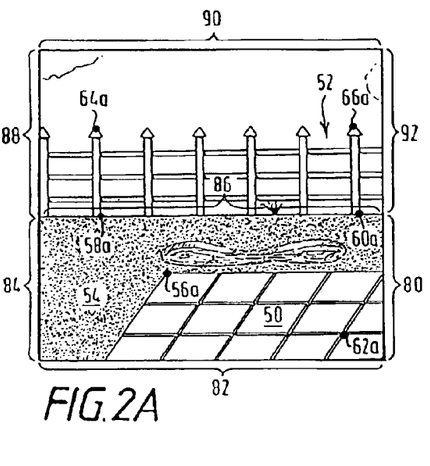
FIGS. 2*a*, 2*b*, 2*c* and 2*d* show examples of input images of a scene recorded at different times to be processed by the apparatus shown in FIG. 1 to generate a time-lapse sequence of images.
Figure 2B:
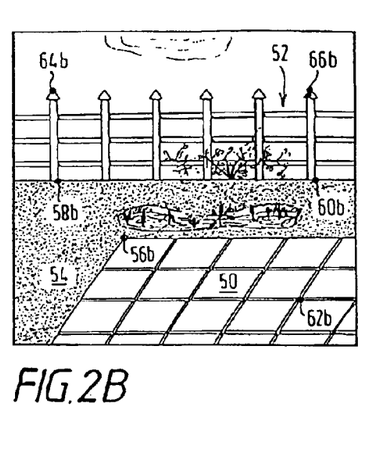
Figure 2C:
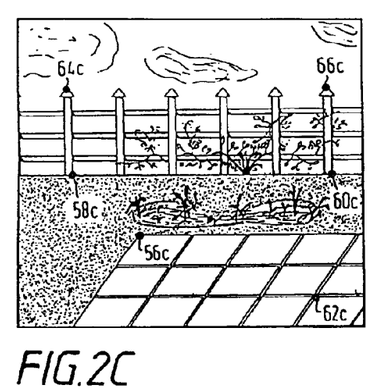
Figure 2D:
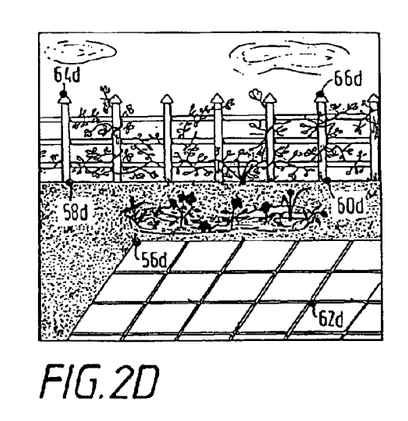

In this embodiment, it is not necessary for the input images to be recorded at equally spaced time intervals that is, the time between the recording of the image shown in FIG. 2a and the image shown in FIG. 2b can be different from the time between the time at which the image shown in FIG. 2b was recorded and the time at which the image shown in FIG. 2c was recorded. In addition, the number of input images is not limited to four, and any number can be input, provided there are at least two.

In addition, as will be seen from FIGS. 2a, 2b, 2c and 2d, the input images, while showing substantially the same scene, are not necessarily recorded from the same viewing position or viewing direction. For example, referring to FIGS. 2a and 2b, and in particular the paved patio area 50, it will be seen that the image in FIG. 2b was recorded at a viewing position further away from the fence 52 than the viewing position at which the image in FIG. 2a was recorded, and with a viewing direction to the right of the viewing direction with which the image in FIG. 2a was recorded.

It will be appreciated that, while the input images shown in the example of FIGS. 2a, 2b, 2c and 2d were recorded over a period of several months, the input images could be recorded over any timescale.

Regarding the number of input images, and the time between the times at which they were recorded, the additional images generated by processing apparatus 2 will be more accurate (that is, will better resemble the true state of the scene at the time the generated image is supposed to represent) the closer the times at which the input images were recorded so that the changes in the scene between the input images are smaller. Similarly, the accuracy of the images generated by processing apparatus 2 will be higher if the input images are recorded under lighting conditions which are approximately the same when each image is recorded.

Figure 3:
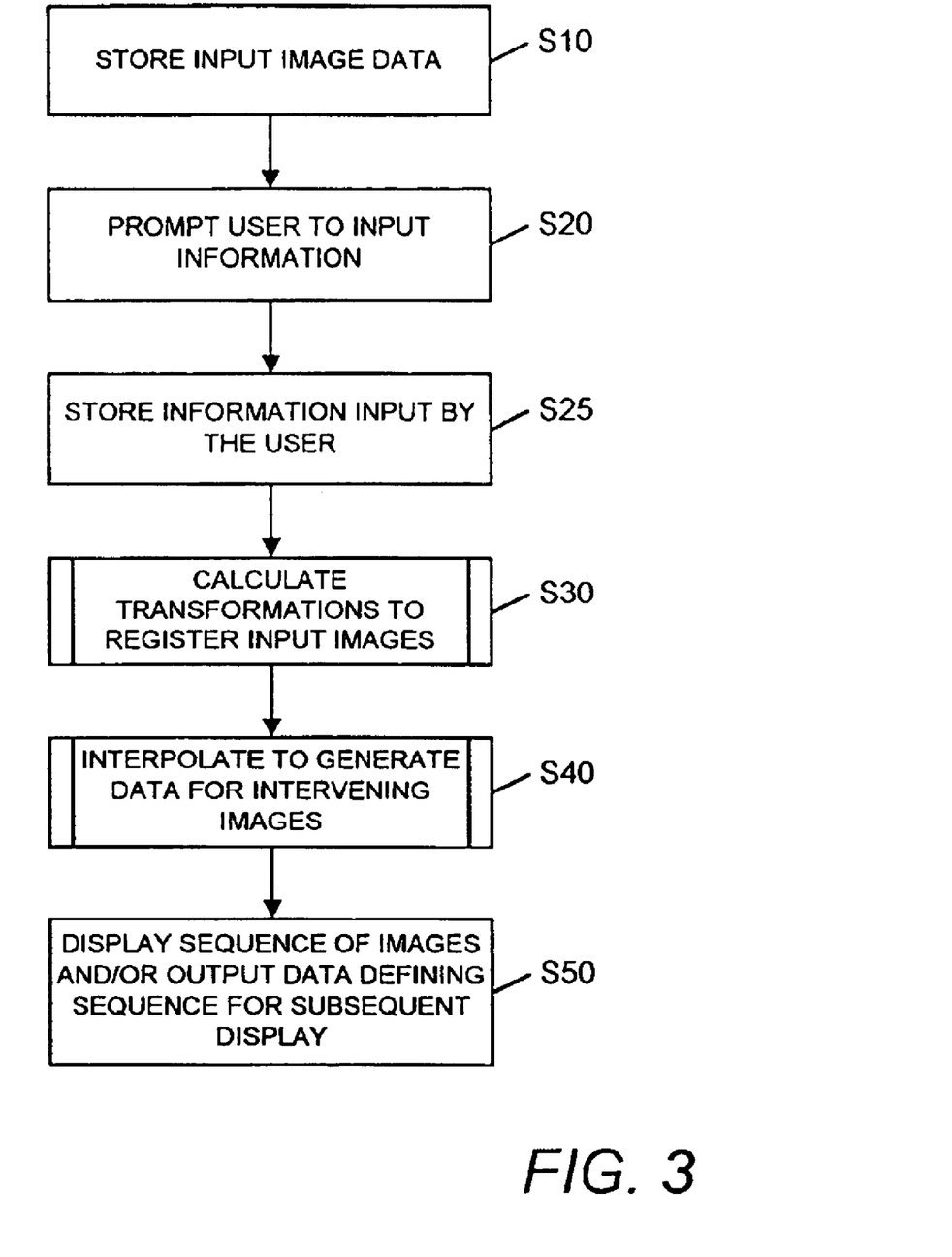
FIG. 3 shows the processing operations performed by the apparatus in FIG. 1.

FIG. 3 shows the processing operations performed in this embodiment by processing apparatus 2.

Referring to FIG. 3, at step S110, the image data input to processing apparatus 2 defining the input images is stored in the image data store 28.

At step S20, central controller 20 causes a message to be displayed on display device 6 requesting the user to enter data via the user input devices 4 defining the order in which the input images were recorded, the approximate time between the times at which the input images were recorded, and the required time for which the generated time-lapse sequence is to run when displayed to the user. Information input by the user in response to this request is stored in memory 22 at step S25.

At step S30, central controller 20 and image data registration processor 30 perform processing to calculate transformations suitable to register the input images.

Figure 4:
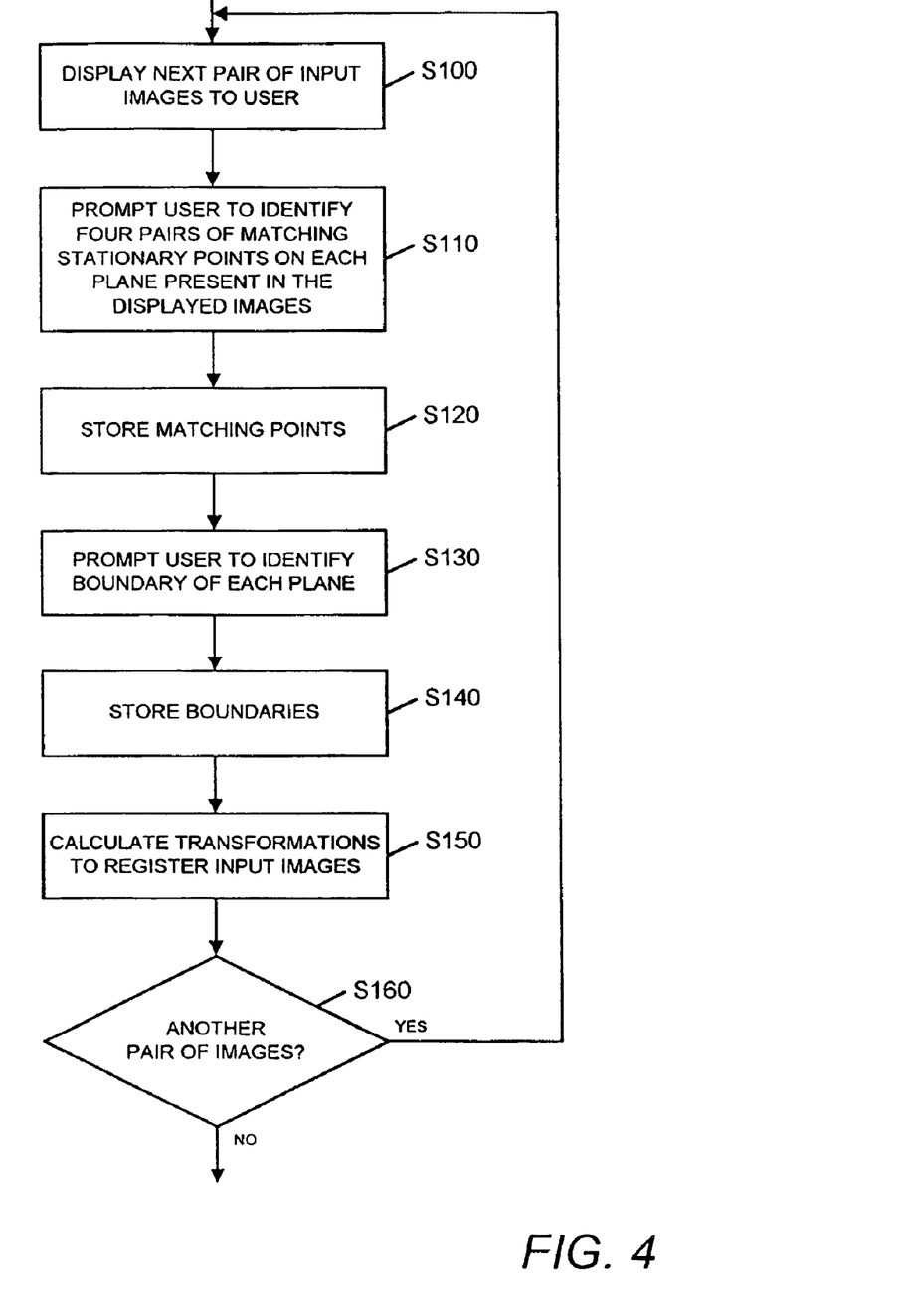
FIG. 4 shows the processing operations performed at step S30 in FIG. 3 to calculate transformations to register the input images.

FIG. 4 shows the processing operations performed by central controller 20 and image data registration processor 30 in this embodiment to calculate the transformations at step S30.

Referring to FIG. 4, at step S100, central controller 20 uses the information stored at step S25 defining the order of the input images to read the image data from image data store 28 defining the next pair of consecutive input images (this being the first and second input images in time of recording order the first time step S100 is performed) and displays the pair of input images on display device 6 via image renderer 40 and frame buffer 42.

At step S110, central controller 20 causes a message to be displayed on display device 6 asking the user to identify four pairs of matching points (that is, the point in each displayed image which corresponds to the same real-world point) on each plane present in the displayed images, each point being a stationary point (that is, a point on an object which is not moving, an example of a moving object being a growing plant etc.). Preferably, the user is instructed to select the four points on each plane so that the points are spread through the area of the plane which is visible in both of the displayed images. The user then inputs this information by using an input device such as a mouse to identify a point in the first displayed image and the corresponding (matching) point in the second displayed image. Referring to FIGS. 2a and 2b by way of example, the patio 50 and lawn 54 lie in one plane, while the fence 52 lies in a second plane. Accordingly, at step S110, the user identifies four pairs of matching points on the patio 50 and/or lawn 54 (such as points 56a and 56b, 58a and 58b, 60a and 60b, and 62a and 62b) and four pairs of matching points on fence 52 (such as points 58a and 58b, 60a and 60b, 64a and 64b, and 66a and 66b).

At step S120, the coordinates of the matching points identified by the user at step S110 are stored in memory 22.

At step S130, central controller 20 causes a message to be displayed on display device 6 requesting the user to identify the boundary of each plane in the images on which matching points were identified at step S110. In this embodiment, this is performed by the user moving a cursor around the boundary of each plane using a user input device 4. Referring to FIG. 2 by way of example, the user defines the extent of the plane containing the patio 50 and lawn 54 by moving a cursor along the image edges 80, 82 and 84 and along the boundary 86 between the lawn 54 and the fence 52. To define the plane of the fence 52, the user moves the cursor along the image edges 88, 90 and 92 and along the boundary 86.

At step S140, central controller 20 stores the coordinates of the boundaries in each image input by the user at step S130.

At step S150, image data registration processor 30 reads the coordinates of the matching points stored at step S120 and calculates the respective transformation for each plane which will register the four pairs of matching points in the images, that is, the transformation which will transform the four points in the second image of the pair so that they align with the four points in the first image of the pair. In this embodiment, image data registration processor 30 calculates each transformation by calculating the 3×3 matrix H which satisfies the following equation:

$$H \begin{pmatrix} x_i \\ y_i \\ 1 \end{pmatrix} = \begin{pmatrix} u_i \\ v_i \\ w_i \end{pmatrix} \quad (1)$$

where:

$(x_i, y_i)$ are the coordinates of the points in one input image and $(x'_i, y'_i)$ are the coordinates of the corresponding (matched) points in the other input image (i=1, 2, 3, 4); and $x'_i = u_i/w_i$ and $y'_i = v_i/w_i$.

Equation (1) can be written as:

$$\begin{pmatrix} h_0 h_1 h_2 \\ h_3 h_4 h_5 \\ h_6 h_7 h_8 \end{pmatrix} \begin{pmatrix} x_i \\ y_i \\ 1 \end{pmatrix} = \begin{pmatrix} x'_i w_i \\ y'_i w_i \\ w_i \end{pmatrix} \quad (2)$$

This gives:

$$h_0 x_i + h_1 y_i + h_2 = x'_i w_i \quad (3)$$

$$h_3 x_i + h_4 y_i + h_5 = y'_i w_i \quad (4)$$

$$h_6 x_i + h_7 y_i + h_8 = w_i \quad (5)$$

However, wi can be eliminated to get 2 equations per point, as follows:

$$h_0 x_i + h_1 y_i + h_2 = x'_i (h_6 x_i + h_7 y_i + h_8) \quad (6)$$

$$h_3 x_i + h_4 y_i + h_5 = y'_i (h_6 x_i + h_7 y_i + h_8) \quad (7)$$

Rearranging gives:

$$h_0 x_i + h_1 y_i + h_2 - h_6 x_i x'_i - h_7 y_i x'_i - h_8 x'_i = 0 \quad (8)$$

$$h_3 x_i + h_4 y_i + h_5 - h_6 x_i y'_i - h_7 y_i y'_i - h_8 y'_i = 0 \quad (9)$$

Putting the four sets of two equations together gives:

$$\begin{pmatrix} x_1 & y_1 & 1 & 0 & 0 & 0 & -x_1 x'_1 & -y_1 x'_1 & -x'_1 \\ 0 & 0 & 0 & x_1 & y_1 & 1 & -x_1 y'_1 & -y_1 y'_1 & -y'_1 \\ x_2 & y_2 & 1 & 0 & 0 & 0 & -x_2 x'_2 & -y_2 x'_1 & -x'_2 \\ 0 & 0 & 0 & x_2 & y_2 & 1 & -x_2 y'_2 & -y_2 y'_2 & -y'_2 \\ x_3 & y_3 & 1 & 0 & 0 & 0 & -x_3 x'_3 & -y_3 x'_3 & -x'_3 \\ 0 & 0 & 0 & x_3 & y_3 & 1 & -x_3 y'_3 & -y_3 y'_3 & -y'_3 \\ x_4 & y_4 & 1 & 0 & 0 & 0 & -x_4 x'_4 & -y_4 x'_4 & -x'_4 \\ 0 & 0 & 0 & x_4 & y_4 & 1 & -x_4 Y'_4 & -y_4 y'_4 & -y'_4 \end{pmatrix} \begin{pmatrix} h_0 \\ h_1 \\ h_2 \\ h_3 \\ h_4 \\ h_5 \\ h_6 \\ h_7 \\ h_8 \end{pmatrix} = 0$$

The matrix M on the left is an 8×9 matrix but can be made square (9×9) by multiplying both sides by the transpose of M, as follows (note that, if there are more than four points, more rows can be added to M and $M^T M$ will still be a 9×9 matrix):

$$(M^T M) h = 0 \quad (11)$$

Equation (11) is in the well known Eigensystem form:

$$Ax = \lambda x \quad (12)$$

with $A = M^T M$ (a symmetric 9×9 matrix) and $\lambda = 0$. This cannot be solved analytically, but can be solved numerically in a number of ways. For example, in this embodiment, image data registration processor 30 and central controller 20 are arranged to perform processing to solve the equation using the method described in Chapter 11 of "Numerical Recipes in C" ISBN 0-521-43108-5. More particularly, image data registration processor 30 and central controller 20 are arranged to use the routines "jacobi" and "eigsrt" in the above-referenced "Numerical Recipes in C" to calculate the eigenvectors (x's) of A (in general there will be 9 distinct solutions) and to take the solution with the eigenvalue (x) closest to zero. This vector then contains the 9 elements of the matrix H that defines the required image transformation.

Referring again to FIG. 4, at step S160, central controller 20 determines whether there is data stored in image data store 28 defining a further input image, and steps S100 to S150 are repeated until each pair of consecutive input images has been processed in the manner described above. More particularly, after processing the first and second input images, the second and third input images are processed in the same way, followed by the third and fourth input images etc.

Referring again to FIG. 3, at step S40, image data registration processor 30, interpolator 32 and central controller 20 perform processing to generate data defining images representing the state of the scene between the times at which the input images were recorded.

Figure 5:
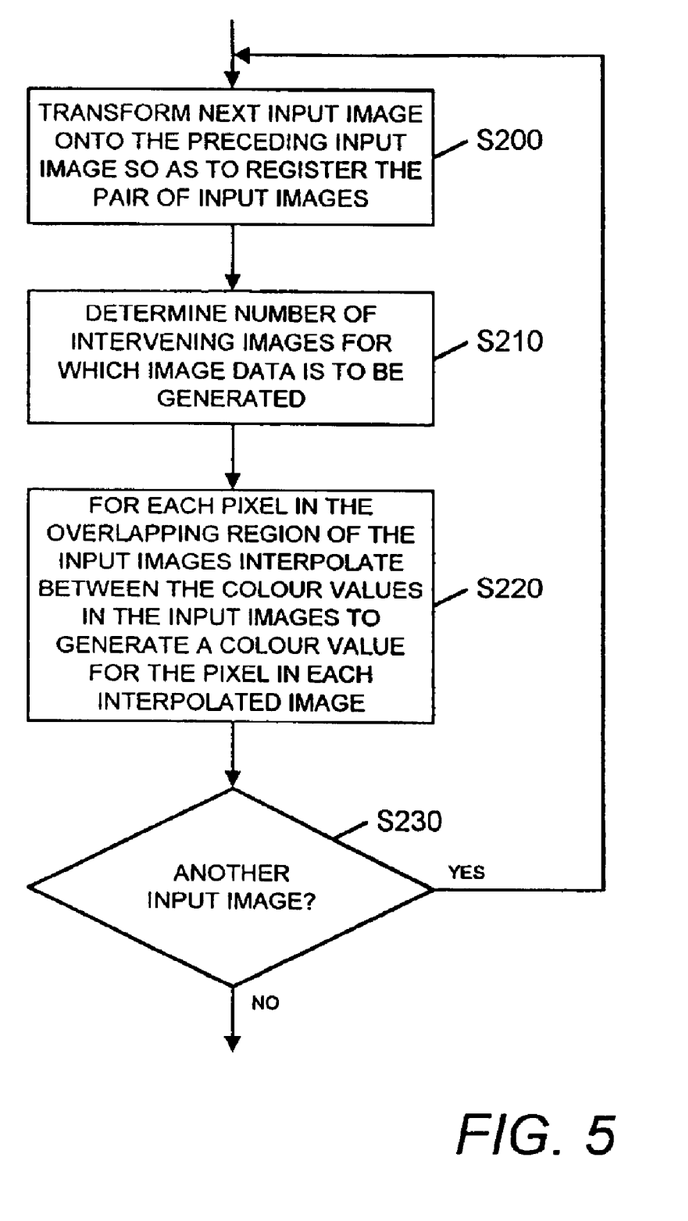
FIG. 5 shows the processing operations performed at step S40 in FIG. 3 to generate interpolated image data.

FIG. 5 shows the processing operations performed at step S40.

Referring to FIG. 5, at step S200, image data registration processor 30 applies the transformations calculated at step S150 to the input image data so as to register the next pair of input images (this being the first pair the first time step S200 is performed).

Figure 6:
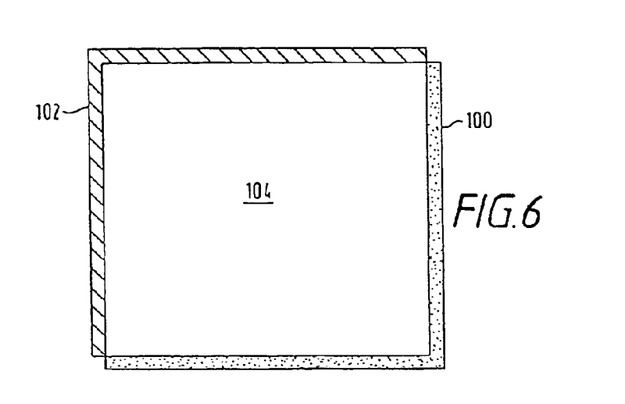
FIG. 6 schematically shows the effect of registering a pair of input images at step S200 in FIG. 5.

FIG. 6 shows the effect of registering the input image shown in FIG. 2b with the input image shown in FIG. 2a.

Referring to FIG. 5, the effect of registering the input images is to overlap the input image 100 representing the input image shown in FIG. 2b with the input image 102 representing the input image shown in FIG. 2a such that the matching points identified by the user at step S110 are aligned. In FIG. 5, the parts of image 100 shaded with dots represent the parts of the image shown in FIG. 2b which are not present in the image shown in FIG. 2a Similarly, the parts of image 102 shaded with diagonal lines represent the parts of the image shown in FIG. 2a which are not present in the image shown in FIG. 2b. The unshaded portion 104 represents the area which is present in both the input image shown in FIG. 2a and the input image shown in FIG. 2b.

Referring again to FIG. 5, at step S210, interpolator 32 and central controller 20 use the information stored in memory 22 at step S25 defining the approximate time between the times at which the input images were recorded and the required run time for the time-lapse sequence of images to be generated, to determine the number of intervening images in the time-lapse sequence between the pair of input images currently being considered, for which input image data is to be generated.

At step S220, interpolator 32 and central controller 20 generate image data defining each intervening image in the time-lapse sequence between the pair of input images currently being considered. More particularly, in this embodiment, for each pixel in the region where the input images overlap after registration (that is, region 104 in FIG. 6) interpolator 32 and central controller 20 perform interpolation between the value of the pixel in the first input image of the pair and the value of the pixel in the second input image of the pair. For each given pixel in the region 104, this interpolation is performed to generate a value for each intervening image in the time-lapse sequence in dependence upon the position of the intervening image in the sequence. In this embodiment, interpolator 32 and central controller 20 are arranged to calculate the pixel values using linear interpolation. The pixel values generated at step S220 are stored in the interpolated image data store 36.

At step S230, central controller 20 determines whether there is another input image to be processed, and steps S200 to S230 are repeated until each successive pair of input images have been processed in the manner described above. When these steps have been performed for all of the input images, image data has been generated and stored for images defining a time-lapse sequence.

Referring again to FIG. 3, at step S50, central controller 20 and image renderer 40 use the image data defining the input images stored in the image data store 28 and the image data defining the interpolated images stored in the interpolated image data store 36 to display the time-lapse sequence to the user on display device 6.

In this embodiment, image renderer 40 and central controller 20 are arranged to perform processing such that, when an input image is to be displayed as part of the time-lapse sequence, only the pixel values for the region 104 shown in FIG. 6 in which the registered images overlap are read from image data store 28 and displayed on monitor 6. This prevents a change in image size when an input image is displayed followed by interpolated images.

In addition, or instead, output processor 44 outputs signals defining information from which the time-lapse sequence can be generated and displayed by a processing apparatus which receives the output signals. In this embodiment, output processor 44 is operable to output signals defining the image data of the input images stored in image data store 28 and the interpolated images stored in the interpolated image data store 36. In addition, output processor 44 is operable to output image data from image data store 28 defining the input images, information defining the transformations calculated by image data registration processor 30 to register the input images, and information defining the type of interpolation performed by interpolator 32. In this way, a receiving apparatus which itself has an interpolator can reconstruct the image data for the time-lapse sequence, and it is unnecessary for output processor 44 to output pixel data for each interpolated image.

A number of modifications are possible to the embodiment described above.

For example, in the embodiment above, image data registration processor 30 is arranged to calculate transformations to register the input images using matching features in the images identified by the user. However, image data registration processor 30 may itself be arranged to identify matching features in the input images using conventional image processing techniques, such as the feature matching techniques described in "Adaptive Least Squares Correlation: A Powerful Image Matching Technique" A. W. Gruen and S. Afr in Journal of Photogrammetry, Remote Sensing and Cartograhy 14(3)1985 pages 175–187 and/or by entropy matching techniques described in "Alignment by Maximisation of Mutual Information", P. Viola and W. Wells in ICCV 5, Jun. 20–23 1995, MIT, ISBN 0-8186-7042-8 pages 16–23. As will be appreciated by the skilled person, for some of these techniques, the closer the input images are taken to the same viewing position and same viewing direction, the easier it will be to perform matching and the more accurate the matches will be. In addition, image data registration processor 30 may be arranged to calculate the transformations on the basis of a combination of user identified matches and matches calculated itself using image processing techniques.

In the embodiment above, in steps S100–S160 (FIG. 4), each input image is registered to the preceding input image using points matched in the pair of images by the user. Instead, all of the input images may be displayed to the user simultaneously and the user requested to match points which are present in all of the input images. In this way, each input image would then be registered to the first input image, rather than the preceding input image. Of course, this effect is also achieved if the user matches the same points between each pair of images (as illustrated in FIGS. 2*a*, 2*b*, 2*c* and 2*d*).

In the embodiment above, each plane in the input images is registered, which increases the accuracy of the interpolated image data. However, it is possible to register the images using matching points which lie on just one plane, or indeed matching points which do not necessarily lie on the same plane, with a subsequent loss of accuracy in the interpolated data.

In the embodiment above, each plane in the input images is registered using four pairs of matching points. By using four pairs of points, a full projective transformation can be calculated as described in the embodiment above, which will take account of all perspective effects in the images. However, it is possible to perform registration using fewer pairs of matching points. For example, using three pairs of matching points, an affine transformation could be calculated, in which case perspective effects in the images would be lost.

In the embodiment above, at step S200 (FIG. 5), an input image is transformed to register it with the preceding image, and subsequently at step S220, interpolation is performed for each pixel in the overlapping region of the resulting registered input images. However, as will be appreciated by the skilled person, it is possible to perform these steps together so as to transform and generate interpolated values for a pixel using a single mathematical operation.

In the embodiment above, at step S40 the image data for the intervening images in the time-lapse sequence is calculated for each pixel in each intervening image by linear interpolation between the value of the pixel in one input image and the value of the pixel in the following input image. This linear interpolation assumes that each input image will be displayed as one frame of the time-lapse video sequence. However, to ensure that the input images are more prominent in the time-lapse sequence, it is possible to repeatedly display each input image over a number of consecutive frames in the time-lapse sequence. In this case, the number of intervening images to be calculated by interpolation is reduced and the linear interpolation parameters are adjusted accordingly.

In the embodiment above, at step S40, the image data for intervening images in the time-lapse sequence is generated by linear interpolation. However, other types of interpolation could be performed.

In the embodiment above, output processor 44 is operable to output the pixel data of the input images together with the registration transformations and information defining the type of interpolation performed by interpolator 32. However, instead, output processor 44 may be arranged to output pixel data for a number of interpolated images together with information defining the interpolation so that further images can be generated by the receiving processor.

The apparatus in the embodiment above may be arranged to perform processing to update the time-lapse sequence if the user adds further input images, either to improve the accuracy of an existing sequence, or to extend an existing sequence using input images recorded at later times than those originally processed.

In the embodiment above, processing is performed by a computer using processing routines defined by programming instructions. However, some, or all, of the processing could be performed using hardware.

Other changes and modifications can be made without departing from the spirit and scope of the invention.

What is claimed is:

1. An apparatus for processing image data defining a plurality of input images said apparatus comprising:
   an image registering unit, arranged to register the input images so that the registered input images represent a scene from a same viewing position and direction relative to the scene, wherein the plurality of input images are of a changing scene recorded at different times from at least one of different viewing positions and different viewing directions; and
   a pixel value interpolator, arranged to interpolate between pixel values of the registered input images to generate pixel values for interpolated images from the same viewing position and direction relative to the scene for an image sequence, the image sequence conveying an evolving representation of the scene from the same viewing position and direction between the times at which the first and last input images were recorded.

2. An apparatus according to claim 1, wherein said image registering unit comprises:
   a transformation calculator, arranged to calculate transformations to transform the input images; and
   a transformation applicator, arranged to the use the transformations calculated by said transformation calculator to register the input images.

3. An apparatus according to claim 2, wherein said transformation calculator comprises a matching unit, arranged to match features in the input images and a calculator, arranged to calculate the transformations on the basis of the matched features.

4. An apparatus according to claim 2, wherein said transformation calculator comprises an input-signal processor, arranged to process signals input by a user defining matching features in the input images to calculate the transformations.

5. An apparatus according to claim 1, wherein said pixel value interpolator is arranged to generate the pixel values for the interpolated images using linear interpolation.

6. An apparatus according to claim 1, wherein said pixel value interpolator is arranged to generate pixel values for interpolated images to be displayed in the image sequence in which each input image is to be displayed a plurality of consecutive times.

7. An apparatus according to claim 1, further comprising an overlap detector, arranged to process input images registered by said image registering unit to determine an area of overlap thereof, and wherein, said pixel value interpolator is arranged to interpolate between the pixel values for pixels in the area of the overlap only.

8. An image processing apparatus generating data for a time-lapse sequence of images of a changing scene from a same viewing position and direction relative to the changing scene, said apparatus comprising:
   a transformation calculator, arranged to calculate transformations to register input images, representing the changing scene recorded from at least one of different viewing positions and different viewing directions so that the registered input images represent the changing scene from the same viewing position and direction relative to the changing scene; and
   an image data generator, arranged to use the input images and the calculated transformations to generate data for images of the scene from the same viewing position and direction to be displayed in the sequence, the sequence conveying an evolving representation of the changing scene from the same viewing position and direction between the times at which the first and last input images were recorded.

9. A method of processing image data defining a plurality of input images, said method comprising the steps of:
   registering the input images so that the registered input images represent a scene from a same viewing position and direction relative to the scene, wherein the plurality of input images are of a changing scene recorded at different times from at least one of different viewing positions and different viewing directions; and
   interpolating between pixel values of the registered input images to generate pixel values for interpolated images from the same viewing position and direction relative to the scene for an image sequence, the image sequence conveying an evolving representation of the scene from the same viewing position and direction between the times at which the first and last input images were recorded.

10. A method according to claim 9, wherein said registering step comprises:
    calculating transformations to transform the input images; and
    using the transformation calculated in the transformation calculating step to register the input images.

11. A method according to claim 10, wherein, in said transformation calculating step, features in the input images are matched and the transformations are calculated on the basis of the matched features.

12. A method according to claim 10, wherein, in said transformation calculating step, signals input by a user defining matching features in the input images are processed to calculate the transformations.

13. A method according to claim 9, wherein, in said interpolating step, the pixel values for the interpolated images are generated using linear interpolation.

14. A method according to claim 9, wherein, in said interpolating step, pixel values are generated for interpolated images to be displayed in an image sequence in which each input image is to be displayed a plurality of consecutive times.

15. A method according to claim 9, further comprising a step of processing registered input images to determine an area of overlap thereof, and wherein, in said interpolating step, the pixel values for the interpolated images are generated for the area of overlap only.

16. A method according to claim 9, further comprising a step of generating a signal conveying data from which the sequence of images can be generated.

17. A method according to claim 16, wherein the signal comprises image data.

18. A method according to claim 16, further comprising a step of recording the signal either directly or indirectly.

19. A method according to claim 9, further comprising a step of displaying the sequence of images.

20. An image processing method for generating data for a time-lapse sequence of images of a changing scene from a same viewing position and direction relative to the changing scene, said method comprising the steps of:

calculating transformations to register input images, representing the scene recorded from at least one of different viewing positions and different viewing directions so that the registered input images represent the changing scene from the same viewing position and direction relative to the changing scene; and generating, using the input images and the calculated transformations, data for images of the changing scene from the same viewing position and direction to be displayed in the sequence, the sequence conveying an evolving representation of the changing scene from the same viewing position and direction between the times at which the first and last input images were recorded.

21. A storage device storing computer-useable instructions for causing a programmable processing apparatus to become operable to perform a method according to any one of claims 9 to 20.

22. A signal conveying computer-useable instructions for causing a programmable processing apparatus to become operable to perform a method according to any one of claims 9 to 20.

23. An apparatus for processing image data defining a plurality of input images said apparatus comprising:

registration means for registering the input images so that the registered input images represent a scene from a same viewing position and direction relative to the scene, wherein the plurality of input images are of a changing scene recorded at different times from at least one of different viewing positions and different viewing directions; and interpolation means for interpolating between pixel values of the registered input images to generate pixel values for interpolated images from the same viewing position and direction relative to the scene for an image sequence, the image sequence conveying an evolving representation of the changing scene from the same viewing position and direction between the times at which the first and last input images were recorded.

24. An image processing apparatus for generating data for a time-lapse sequence of images of a changing scene from a same viewing position and direction relative to the changing scene, said apparatus comprising:

transformation calculating means for calculating transformations to register input images, representing the changing scene recorded from at least one of different viewing positions and different viewing directions so that the registered input images represent the changing scene from the same viewing position and direction relative to the changing scene; and generating means for generating data for images of the scene from the same viewing position and direction to be displayed in the sequence using the input images and the calculated transformations, the sequence conveying an evolving representation of the changing scene from a fixed viewing position and direction between the times at which the first and last input images were recorded.

* * * * *

UNITED STATES PATENT AND TRADEMARK OFFICE
CERTIFICATE OF CORRECTION

PATENT NO. : 6,904,184 B1
DATED : June 7, 2005
INVENTOR(S) : Richard Ian Taylor

It is certified that error appears in the above-identified patent and that said Letters Patent is hereby corrected as shown below:

Title page,
Item [75], Inventor, "Guilford (GB)" should read -- Guildford (GB) --.

Column 3,
Line 24, "intervals" should read -- intervals, --.
Line 61, "step S110," should read -- step S10, --.

Column 5,
Line 33, "wi" should read -- $w_i$ --.
Line 49, "$y_2x'_1$" should read -- $y_2x'_2$ --.
Line 55, "$x_4Y'_4$" should read -- $x_4y'_4$ --.
Line 57, "on the left" should read -- on the left above --.

Column 7,
Line 63, "Cartograhy" should read -- Cartography --.

Column 9,
Line 17, "images" should read -- images, --.
Line 37, "the use" should read -- use --.
Line 61, "wherein," should read -- wherein --.

Column 11,
Line 27, "images" should read -- images, --.

Signed and Sealed this

Twenty-first Day of February, 2006

JON W. DUDAS
*Director of the United States Patent and Trademark Office*